Patented June 16, 1936

2,044,084

UNITED STATES PATENT OFFICE 2,044,084

SECONDARY DISAZO DYESTUFFS AND THEIR PRODUCTION

Arthur Howard Knight, Blackley, Manchester, England, assignor to Imperial Chemical Industries Limited, a corporation of Great Britain No Drawing. Application July 16, 1934, Serial No. 735,539. In Great Britain July 18, 1933

11 Claims. (Cl. 260—84)

According to the present invention I manufacture new secondary disazo dyestuffs for dyeing and printing cellulose esters and ethers by combining a diazotized non-nitrated aniline with aminohydroquinone di-(β-hydroxyethyl) ether, diazotizing the aminoazo compound so formed and combining the diazoazo compound in acid medium with 1,5-aminonaphthol, or with 1-β-hydroxyethylamino-5-naphthol. The non-nitrated aniline may be substituted in the nucleus by a chlorine, bromine, or a methyl substituent.

Also according to the invention I use the so-obtained dyestuffs in dyeing or printing cellulose esters and ethers.

A satisfactory method of preparing the intermediates is to react hydroquinone with ethylene chlorhydrin, acetylate the so prepared hydroquinone-di-(beta-hydroxyethyl)-ether, nitrate the acetylated compound, reduce it, and deacetylate.

In making the new dyestuffs the diazotized amine may be conveniently coupled with the hydroquinone derivative by adding the solution obtained by diazotizing the amine to a weak acid solution of the hydroquinone derivative and then adding sodium acetate to facilitate coupling. The resulting aminoazo compound may then be rediazotized without isolation, the diazoazo compound so obtained added to the aminonaphthol and coupled under acid conditions.

The dyestuffs may be applied to cellulose ethers and esters either by dyeing from a finely dispersed suspension in water at about 75–80° C. or by printing an aqueous paste of the dyestuff and gum senegal or gum tragacanth with or without glycerine and steaming.

Dyeings and prints of good fastness to light and washing, of good dischargeability and of greener shades of blue than those given by previous dyes of this azo class are obtained.

Aminohydroquinone-di-(β-hydroxyethyl) ether may be manufactured by the process described and claimed in copending application Serial No. 733,682 and 1-β-hydroxyethylamino-5-naphthol may be manufactured by boiling 159 parts of 1,5-aminonaphthol with 1300 parts aqueous ethylene chlorhydrin of 30% strength and 108 parts of precipitated chalk (calcium carbonate) for 2½ hours. The β-hydroxyethylaminonaphthol separates on cooling, it melts at 144° C. after recrystalizing from alcohol.

The following examples in which the parts are by weight, illustrate but do not limit the invention.

Example 1

The solution obtained by diazotizing 107 parts of o-toluidine in the known way is added to a solution of 202.3 parts of aminohydroquinone-di-(β-hydroxyethyl) ether in 352 parts of 10% hydrochloric acid and 600 parts of water at 5° C. A solution of 176 parts of sodium acetate in 1400 parts of water is then gradually added to facilitate combination. When combination is complete 555 parts of 10% hydrochloric acid are added to the suspension of the hydrochloride of the aminoazo compound so-obtained. The mixture is heated to 25° C. and the aminoazo compound diazotized by the addition of 66.5 parts of sodium nitrite.

When diazotization is complete the solution of the diazoazo compound so-obtained is filtered if necessary, the filtrate cooled to 15° C. and then added to a solution of 151 parts of 1,5-aminonaphthol in 352 parts of 10% hydrochloric acid and 800 parts of water at 15° C. The mixture is stirred until combination is complete, when the dyestuff suspension so-obtained is rendered just alkaline with sodium carbonate. The dyestuff is filtered off, washed with water, and preserved as paste or dried in any suitable way. It dissolves in concentrated sulphuric acid with a brown color and in ethyl acetate with a reddish-blue color and dyes cellulose acetate in clear reddish-blue shades of good washing fastness and dischargeability.

The dyestuff probably has the following constitution:

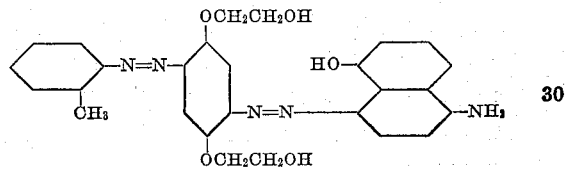

and yields on reduction with tin and hydrochloric acid o-toluidine, 2,5-diaminohydroquinone-di-(β-hydroxyethyl) ether and 1,4-diamino-8-naphthol.

Example 2

The solution obtained by diazotizing 127.5 parts of o-chloroaniline in the known way is added to a solution of 213 parts of aminohydroquinone-di-(β-hydroxyethyl) ether in 370 parts of 10% hydrochloric acid and 6000 parts of water at 10° C. Combination is facilitated by the cautious addition of sufficient acetate to remove the free mineral acidity of the medium. When combination is complete 590 parts of 10% hydrochloric acid are added to the suspension of the hydrochloride of the aminoazo compound so-obtained. The mixture is heated to 35° C. and the aminoazo compound diazotized by the addition of 72 parts of sodium nitrite, the mixture being stirred at 35° C. until diazotization is complete, the diazoazo compound being in solution. This solution is filtered if necessary and, after cooling to 15° C. is added to a solution of 203 parts of 1-β-hydroxyethylamino-5-naphthol in 370 parts of 10% hydrochloric acid and 8000 parts of water. The mixture is stirred until combination is complete when the dyestuff is rendered just alkaline with sodium carbonate, the dyestuff filtered, washed with water, and either preserved as paste or dried in any suitable way.

It dissolves in concentrated sulphuric acid with a brown colour and in ethyl acetate with a greenish-blue colour and dyes cellulose acetate in bright greenish-blue shades of good fastness to light and washing and good dischargeability.

The dyestuff has probably the following constitution:

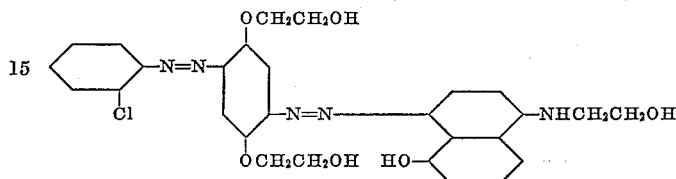

and yields on reduction with tin and hydrochloric acid o-chloroaniline, 2,5-diaminohydroquinone-di-(β-hydroxyethyl) ether and 1-amino-4-β-hydroxyethylamino-8-naphthol.

*Example 3*

127.5 parts of o-chloroaniline are diazotized, coupled with 213 parts of aminohydroquinone-di-(β-hydroxyethyl) ether and the monoazo compound rediazotized as described in Example 2. The filtered solution of the diazoazo compound, cooled to 15° C., is added to a solution of 159 parts of 1,5-aminonaphthol in 370 parts of 10% hydrochloric acid and 8000 parts of water at 15° C. The mixture is stirred until combination is complete when the dyestuff suspension is made just alkaline with sodium carbonate, the dyestuff is filtered off, washed with water, and preserved as paste or dried in any suitable way. It dissolves in concentrated sulphuric acid with a blackish-brown color, and in ethyl acetate with a blue solution. It dyes cellulose acetate in greenish-blue shades of good light fastness and dischargeability.

The dyestuff has probably the following constitution:

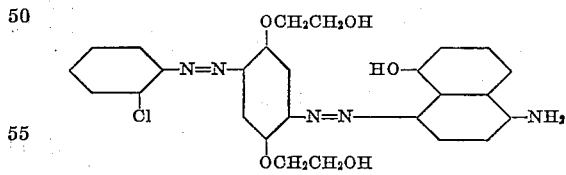

and yields on reduction with tin and hydrochloric acid o-chloroaniline, 2,5-diaminohydroquinone-di-(β-hydroxyethyl) ether, and 1,4-diamino-8-naphthol.

I claim:
1. Process for the manufacture of disazo dyes comprising diazotizing an arylamine chosen from the group consisting of aniline, chloroanilines, bromoanilines and toluidines, coupling the diazo compound with aminohydroquinone di-(β-hydroxyethyl) ether, diazotizing the aminoazo compound so formed, and finally coupling in acid medium with one of a group of compounds consisting of 1,5-aminonaphthol and its N-β-hydroxyethyl derivatives.

2. Process as claimed in claim 1 in which the first component is o-chloroaniline.

3. A new azo dye represented by the formula

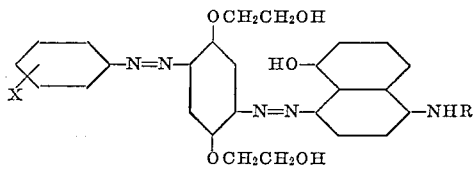

in which X stands for hydrogen, chlorine, bromine or methyl, and R stands for hydrogen or β-hydroxyethyl.

4. A new azo dye giving a blackish brown solution in concentrated sulphuric acid, a blue solution in ethyl acetate, and yielding on reduction with tin and hydrochloric acid o-chloroaniline, 2,5-diaminohydroquinone di-(β-hydroxyethyl) ether, and 1-amino-4-β-hydroxyethylamino-8-naphthol.

5. The method of making a disazo dye which comprises coupling a diazotized aniline free from nitro groups to aminohydroquinone di-(beta-hydroxy-ethyl) ether, diazotizing the so-formed compound, and coupling it to one of a group of compounds consisting of 1,5-aminonaphthol and 1-beta-hydroxy-ethylamino-5-naphthol.

6. The method of making a disazo dye which comprises coupling a diazotized aniline free from nitro groups, and which may have a hydrogen of the nucleus replaced by one of a group of compounds consisting of halogen or alkyl, to aminohydroquinone di-(beta-hydroxy-ethyl) ether, diazotizing the so-formed compound, and coupling it to one of a group of compounds consisting of 1,5-aminonaphthol and 1-beta-hydroxy-ethylamino-5-naphthol.

7. The process as in claim 5 in which the third component is 1,5-aminonaphthol.

8. The process as in claim 5 in which the third component is 1-beta-hydroxy-ethylamino-5-naphthol.

9. An azo dye represented by the formula:

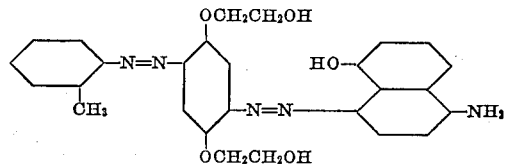

10. A new azo dye represented by the formula:

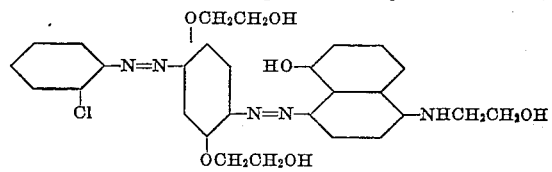

11. A new azo dye represented by the formula:

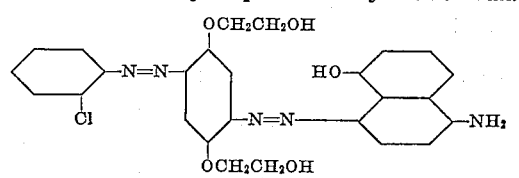

ARTHUR HOWARD KNIGHT.